United States Patent
Lee

(10) Patent No.: US 9,100,571 B2
(45) Date of Patent: Aug. 4, 2015

(54) APPARATUS AND METHOD TO PHOTOGRAPH AN IMAGE

(71) Applicant: Samsung Electronics Co., Ltd, Suwon-si, Gyeonggi-do (KR)

(72) Inventor: Seon-jeong Lee, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 114 days.

(21) Appl. No.: 13/927,293

(22) Filed: Jun. 26, 2013

(65) Prior Publication Data
US 2014/0078334 A1    Mar. 20, 2014

(30) Foreign Application Priority Data
Sep. 19, 2012    (KR) .................. 10-2012-0104095

(51) Int. Cl.
H04N 5/232    (2006.01)
(52) U.S. Cl.
CPC ....... *H04N 5/23241* (2013.01); *H04N 5/23245* (2013.01)
(58) Field of Classification Search
CPC H04N 5/23245; H04N 5/775; H04N 5/23241
USPC .......... 348/220.1, 222.1, 231.2, 335, 231.99, 348/207.999
See application file for complete search history.

(56) References Cited

U.S. PATENT DOCUMENTS

| 7,129,984 | B1 * | 10/2006 | Okada et al. | 348/207.99 |
| 7,450,164 | B2 * | 11/2008 | Miyashita | 348/231.99 |
| 8,610,796 | B2 * | 12/2013 | Kindaichi | 348/220.1 |

* cited by examiner

*Primary Examiner* — Nhan T Tran
(74) *Attorney, Agent, or Firm* — Staas & Halsey LLP

(57) ABSTRACT

An apparatus and a method of photographing an image are provided. The photographing apparatus includes a photographing unit which photographs an image, an input unit which receives a user command, and a controller which, if a user command to turn on the photographing apparatus is input through the input unit, determines whether the photographing apparatus is set to an auto continuous shooting mode, and, if it is determined that the photographing apparatus is set to the auto continuous shooting mode, controls the photographing unit to perform auto continuous shooting after power is supplied to the photographing unit. Accordingly, the photographing apparatus performs continuous shooting more rapidly.

18 Claims, 6 Drawing Sheets

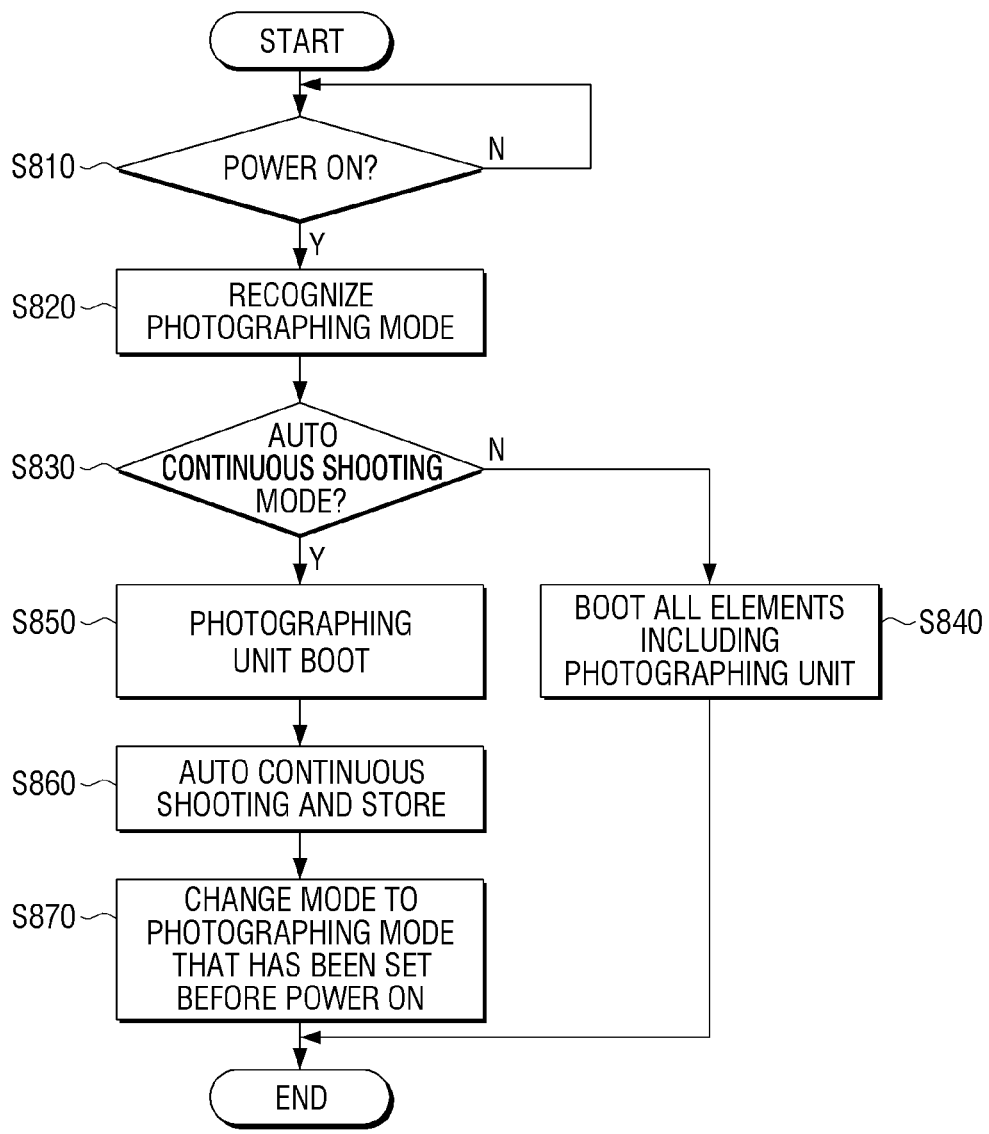

APPARATUS AND METHOD TO PHOTOGRAPH AN IMAGE

CROSS-REFERENCE TO RELATED APPLICATIONS

This application claims priority from Korean Patent Application No. 10-2012-0104095, filed on Sep. 19, 2012, in the Korean Intellectual Property Office, the disclosure of which is incorporated herein by reference in its entirety.

BACKGROUND OF THE INVENTION

1. Field of the Invention

Methods and apparatuses consistent with exemplary embodiments relate to an apparatus and a method to photograph an image, and more particularly, to an apparatus and a method to photograph an image, which can provide auto continuous shooting.

2. Description of the Related Art

When a user photographs a subject using a related-art photographing apparatus, the user photographs an image, while seeing the subject using a viewfinder provided on the photographing apparatus. If the user wishes to perform continuous shooting for the subject, the user performs the continuous shooting by iteratively pressing a shutter or setting an auto continuous shooting mode.

However, such a related-art auto continuous shooting mode has the following problems. First, in order to perform auto continuous shooting, the user should press the shutter for a predetermined time or should perform half shutter and full shutter operations. Specifically, if an auto continuous shooting mode is set to perform continuous shooting, the user performs continuous shooting for the subject by pressing a half shutter, and, if a full shutter is pressed by the user afterward, the photographing apparatus stores images of the subject which are continuously shot. That is, half shutter and full shutter operations should be performed in order to perform continuous shooting for the subject using the auto continuous shooting mode and store a plurality of images which are shot by continuous shooting. However, if one of the half shutter and full shutter operations is performed, the continuous shooting is not performed or the plurality of images shot by the continuous shooting are not stored.

Another problem is that it is highly likely that the photographing apparatus fails to capture and photograph a subject that quickly moves for a very short time using auto continuous shooting. For example, if the user wishes to perform auto continuous shooting for a quickly moving subject when a photographing apparatus such as a digital camera is not turned on, the user turns on the photographing apparatus first and performs auto continuous shooting through the above-described series of operations. In this case, the photographing apparatus requires a time to boot its functions (for example, a lens field emission process, liquid crystal display (LCD) on, and display of on screen display (OSD) on an LCD)) when it is turned on. Therefore, the user does not perform the above-described operations until the time required to boot elapses and, thus may not perform continuous shooting for the quickly moving subject.

SUMMARY OF THE INVENTION

One or more exemplary embodiments may overcome the above disadvantages and other disadvantages not described above. However, it is understood that one or more exemplary embodiment are not required to overcome the disadvantages described above, and may perform other features and utilities not directed to any of the problems described above.

Additional features and utilities of the present general inventive concept will be set forth in part in the description which follows and, in part, will be obvious from the description, or may be learned by practice of the general inventive concept.

Exemplary embodiments of the present inventive concept provide an apparatus and a method to photograph an image, which can perform auto continuous shooting at the same time as the photographing apparatus is turned on.

Exemplary embodiments of the present general inventive concept provide a photographing apparatus including: a photographing unit which photographs an image; an input unit which receives a user command; and a controller which, if a user command to turn on the photographing apparatus is input through the input unit, determines whether the photographing apparatus is set to an auto continuous shooting mode, and, if it is determined that the photographing apparatus is set to the auto continuous shooting mode, controls the photographing unit to perform auto continuous shooting after power is supplied to the photographing unit.

The photographing apparatus may further include a storage unit, and the controller may directly store an image which is photographed by the auto continuous shooting in the storage unit.

The photographing unit may include a lens unit, and, if the user command to turn on the photographing apparatus is input through the input unit, the controller may control the photographing unit to be booted and may control the photographing unit to perform the auto continuous shooting at a time when booting of the lens unit of the photographing unit is completed.

The photographing apparatus may further include: a display unit which displays a photographed image; and an audio output unit which outputs a sound, and the controller may boot at least one of the display unit and the audio output unit, while booting the lens unit.

If the auto continuous shooting is completed, the controller may change the auto continuous shooting mode to a photographing mode that has been finally set before the photographing apparatus is turned on.

If a plurality of photographing modes including the auto continuous shooting mode are set as a mode executed after the photographing apparatus is turned on, the controller may control an operation corresponding to the auto continuous shooting mode to be performed first.

If it is determined that the photographing apparatus is not set to the auto continuous shooting mode, the controller may boot the photographing unit, the display unit, and the audio output unit.

Exemplary embodiments of the present general inventive concept may also provide a method of performing auto continuous shooting in a photographing apparatus, the method including: receiving a user command to turn on the photographing apparatus; determining whether the photographing apparatus is set to an auto continuous shooting mode; and if the photographing apparatus is set to the auto continuous shooting mode, performing auto continuous shooting after power is applied to a photographing unit which photographs an image.

The method may further include directly storing an image which is photographed by the auto continuous shooting.

The performing the auto continuous shooting may include performing the auto continuous shooting at a time when booting of a lens unit of the photographing unit is completed.

The performing the auto continuous shooting may include booting at least one of a display unit which displays a photographed image and an audio output unit which outputs a sound, while the lens unit is being booted.

The method may further include, if the auto continuous shooting is completed or an image which is photographed by the auto continuous shooting is stored, changing the auto continuous shooting mode to a photographing mode that has been finally set before the photographing apparatus is turned on.

The determining may include, if a plurality of photographing modes including the auto continuous shooting mode are set as a mode executed after the photographing apparatus is turned on, determining that the photographing apparatus is set to the auto continuous shooting mode.

The method may further include, if it is determined that the photographing apparatus is not set to the auto continuous shooting mode, booting the photographing unit, the display unit, and the audio output unit.

According to the above-described various exemplary embodiments, the photographing apparatus can perform the continuous shooting more rapidly. Accordingly, failure to perform continuous shooting for a subject which quickly moves for a very short time can be minimized.

Exemplary embodiments of the present general inventive concept may also provide a photographing apparatus, comprising: a photographing unit including at least one element required to take a photograph of an image; and a controller to determine whether the photographing apparatus is set to an auto continuous shooting mode, and to control the photographing unit to perform auto continuous shooting of an image after booting of each of the at least one element required to take a photograph and before completion of booting of remaining elements not required to take a photograph, after power is supplied to the photographing unit and it is determined that the auto continuous shooting mode is set.

In an exemplary embodiment, the photographing apparatus further comprises an input unit to receive a command to turn the photographing apparatus on and begin booting of the photographing unit elements.

In an exemplary embodiment, the photographing apparatus further comprises: a display unit; and an audio output unit, wherein the controller controls the photographing unit to perform the auto continuous shooting at a time when booting of the at least one required element is completed and while the display unit and the audio unit are being booted, when it is determined that the photographing apparatus is set to an auto continuous shooting mode.

In an exemplary embodiment, if it is determined that the photographing apparatus is not set to the auto continuous shooting mode, booting the photographing unit, the display unit, and the audio output unit is performed.

In an exemplary embodiment, the elements of the photographing unit comprise: a lens unit; an image sensor; and an image processor, wherein the controller controls the photographing unit to perform the auto continuous shooting at a time when booting of the element that requires the longest booting time is completed.

In an exemplary embodiment, the elements of the photographing unit comprise: a lens unit; an image sensor; and an image processor, wherein the controller controls the photographing unit to perform the auto continuous shooting at a time when booting of the lens unit is completed.

Exemplary embodiments of the present general inventive concept may also provide a non-transient computer readable recording medium containing code to perform a method of performing auto continuous shooting in a photographing apparatus, the method comprising: receiving a user command to turn on the photographing apparatus; determining whether the photographing apparatus is set to an auto continuous shooting mode; and if the photographing apparatus is set to the auto continuous shooting mode, performing auto continuous shooting after power is applied to a photographing unit which photographs an image.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 8 is a flowchart illustrating a method of performing auto continuous shooting of a photographing apparatus according to an exemplary embodiment.

DETAILED DESCRIPTION OF THE PREFERRED EMBODIMENTS

Figure 1:
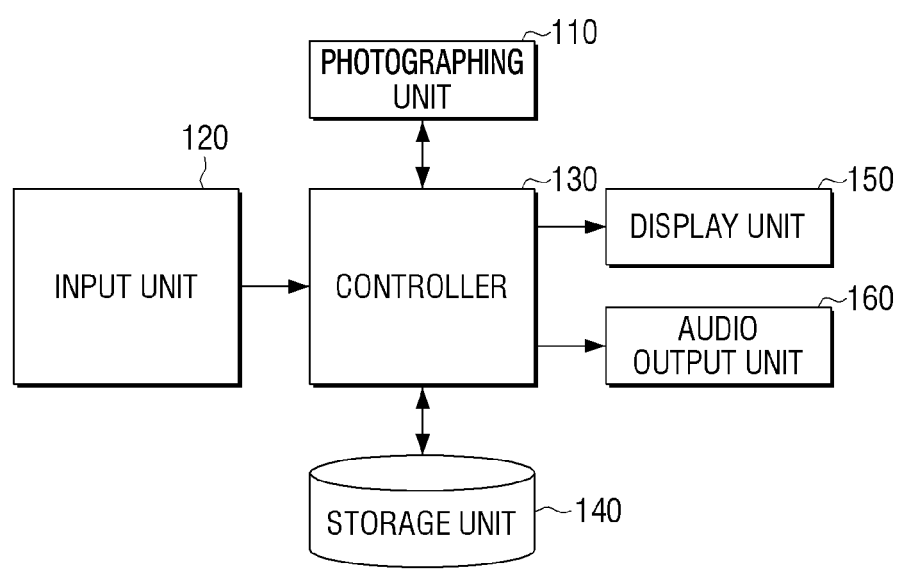
FIG. 1 is a block diagram illustrating a photographing apparatus according to an exemplary embodiment.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating a photographing apparatus according to an exemplary embodiment.

As shown in FIG. 1, the photographing apparatus includes a photographing unit 110, an input unit 120, a controller 130, a storage unit 140, a display unit 150, and an audio output unit 160. The photographing apparatus including the above elements may be a digital camera. However, this is merely an example and the photographing apparatus may be an apparatus that is equipped with a photographing function such as a smartphone.

The photographing unit 110 photographs an image, and specifically, converts an optical signal entering through a lens into an electric signal and generates an image signal through a predetermined signal processing operation. A detailed operation of the photographing unit 110 will be explained below.

The input unit 120 receives various user commands. The input unit 120 may include a power button (not shown) to perform power on, a shutter (not shown) to receive a photographing command, and a touch screen or a manipulation button to set a photographing mode and an additional function of the photographing apparatus.

If a user command to turn on the photographing apparatus is input through the input unit 120, the controller 130, which controls overall operations of each element, determines whether the photographing apparatus is set to an auto continuous shooting mode or another mode. If it is determined that the photographing apparatus is set to the auto continuous shooting mode, the controller 130 controls the photographing unit 110 to perform auto continuous shooting after power is supplied to the photographing unit 110. Accordingly, if power is supplied to the photographing unit 110 through a power supply unit (not show), the photographing unit 110 performs the auto continuous shooting and generates a plurality of images according to a control command of the controller 130, and the controller 130 stores the plurality of images generated by the photographing unit 110 in the storage unit 140.

The photographing unit 110, which photographs a subject in a method corresponding to a photographing mode as described above, may be configured as shown in one of FIGS. 2 and 3. Hereinafter, a detailed configuration of the photographing unit 110, which photographs an image, will be explained.

Figure 2:
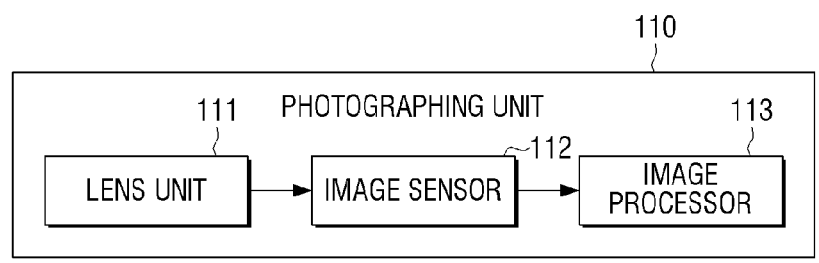
FIG. 2 is a first block diagram illustrating a photographing unit of the photographing apparatus, which photographs an image, in detail according to an exemplary embodiment.
Figure 3:
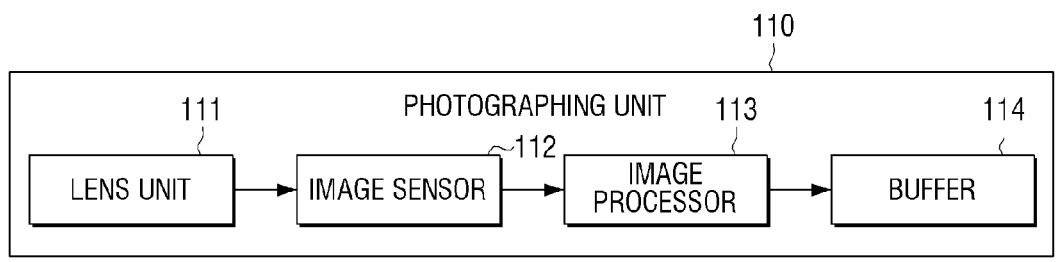
FIG. 3 is a second block diagram illustrating a photographing unit of the photographing apparatus, which photographs an image, in detail according to another exemplary embodiment.

FIG. 2 is a first block diagram illustrating a detailed configuration of the photographing unit of the photographing apparatus, which photographs an image, according to an exemplary embodiment, and FIG. 3 is a second block diagram illustrating a detailed configuration of the photographing unit of the photographing apparatus, which photographs an image, according to another exemplary embodiment.

As shown in FIG. 2, the photographing unit 110, which photographs an image, includes a lens unit 111, an image sensor 112, and an image processor 113. The lens unit 111 allows an optical signal regarding a subject to enter the photographing unit 110. The lens unit 111, which allows the optical signal regarding the subject to enter the photographing unit 110, may be a body tube type lens which outwardly protrudes or an inner zoom type lens which inwardly protrudes. Also, the lens unit 111 may be a removable lens, such as a digital single lens reflex (DSLR). If the optical signal regarding the subject enters through the lens unit 111, the image sensor 112 performs signal processing by converting the optical signal regarding the subject entering through the lens unit 111 into an electric signal, using an image pickup element (not shown) such as a charge coupled device (CCD) or a complementary metal oxide semiconductor (CMOS), and outputs the signal-processed image signal to the image processor 113. Accordingly, the image processor 113 performs signal processing with respect to the image signal output from the image sensor 112, and generates a signal-processed image. Accordingly, the display unit 150 displays the image generated by the image processor 113.

On the other hand, as shown in FIG. 3, the photographing unit 110 may further include a buffer 114. The buffer 114 temporarily stores the image generated by the image processor 113.

Referring back to FIG. 1, if the user command to turn on the photographing apparatus is input through the input unit 120, the controller 130 determines what the pre-set photographing mode is set to. According to an exemplary embodiment, the photographing apparatus may include a mode dial (not shown) to set a photographing mode such as a general photographing mode, a moving image photographing mode, and an auto continuous shooting mode. Accordingly, the controller 130 determines whether the photographing mode set by the mode dial (not shown) is the general photographing mode, the moving image photographing mode, or the auto continuous shooting mode.

According to another exemplary embodiment, the photographing apparatus may store the photographing mode which is pre-set according to a user command which is input through the input unit 120 in the storage 140. That is, the user may set the auto continuous shooting mode so that auto continuous shooting is performed every time that the user presses the power button, which performs power on of the photographing apparatus.

If power is supplied according to the user command to turn on the photographing apparatus, the controller 130 determines whether the photographing mode set by the mode dial or user manipulation is the auto continuous shooting mode. If it is determined that the photographing apparatus is not set to the auto continuous shooting mode, the controller 130 controls the photographing unit 110, the display unit 150, and the audio output unit 160 to be booted. According to such a control command, the photographing unit 110, the display unit 150, and the audio output unit 160 are booted.

On the other hand, if it is determined that the photographing mode is set to the auto continuous shooting mode, the controller 130 controls the photographing unit 110, from among the elements of the photographing apparatus, to be booted. According to an exemplary embodiment, the photographing mode pre-set by the mode dial or the user manipulation may be set to a plurality of photographing modes including the auto continuous shooting mode. In this case, the controller 130 controls an operation corresponding to the auto continuous shooting mode to be performed first.

The photographing unit 110 starts to be booted according to such a control command, and the controller 130 determines whether booting of the photographing unit 110 is completed. If it is determined that the booting is completed, the controller 130 controls the photographing unit 110 to perform auto continuous shooting.

According to an exemplary embodiment, the controller 130 may control the photographing unit 110 to perform the auto continuous shooting at a time when booting of the lens unit 111, from among the elements of the photographing unit 110, is completed. However, this should not be considered as limiting. The controller 130 may control the photographing unit 110 to perform the auto continuous shooting at a time when booting of all of the elements of the photographing unit 110, that is, the lens unit 111, the image sensor 112, and the image processor 113, is completed, or when booting of the element that requires the longest booting time from among the elements is completed.

Specifically, a lens of the lens unit 111, which allows the optical signal regarding the subject to enter, may be a body tube type lens which outwardly protrudes or an inter zoom type lens which inwardly protrudes. In this case, the controller 130 may control the photographing unit 110 to perform the auto continuous shooting at a time when the booting of the lens unit 111 from among the elements of the photographing unit 110 is completed. On the other hand, if the lens of the lens unit 111, which allows the optical signal regarding the subject to enter, is a removable lens such as a DSRL, the controller 130 may control the photographing unit 110 to perform the auto continuous shooting at a time when booting of at least one of the image sensor 112 and the image processor 113 of the photographing unit 110 is completed.

Figure 4:
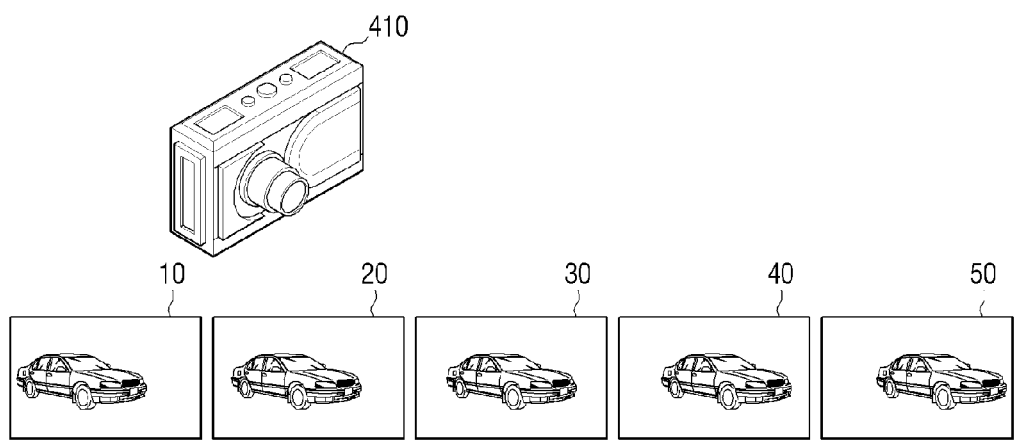
FIG. 4 is a view illustrating auto continuous shooting after the photographing unit of the photographing apparatus is booted according to an exemplary embodiment.

Accordingly, if the booting of the photographing unit 110 is completed, the controller 130 performs the auto continuous shooting as much as a predetermined number of copies according to a control command of the controller 130, as shown in FIG. 4.

FIG. 4 is a view illustrating auto continuous shooting after the photographing unit of the photographing apparatus is booted according to an exemplary embodiment.

As shown in FIG. 4, the user turns on the photographing apparatus which is in a power off state in order to perform auto continuous shooting with respect to a currently moving car. If such a command to turn on the photographing apparatus is input, the controller 130 determines whether a currently set photographing mode is an auto continuous shooting mode or another mode. If the current photographing mode is the auto continuous shooting mode, the controller 130 controls the photographing unit 110 to photograph an image to be booted. Accordingly, the photographing unit 110 boots the lens unit 111, and accordingly, electric field emission of a protrusion lens 410 is performed. If the electric field emission of the lens 410 is completed, the photographing unit 110 performs auto continuous shooting with respect to the moving car according to the control command of the controller 130, and generates a plurality of car images 10 to 50 of the moving car. If the plurality of car images 10 to 50 are generated, the controller 130 stores the plurality of car images 10 to 50 in the storage 140.

However, this should not be considered as limiting. The photographing unit 110 performs auto continuous shooting with respect to the moving car according to the control command of the controller 130, generates the plurality of car images 10 to 50 of the moving car, and temporarily stores the plurality of car images 10 to 50 in the buffer 114.

After that, the display unit 140 displays the plurality of car images 10 to 50 which are stored in the storage unit 140 or the buffer 114 according to a user command or a predetermined condition, and the controller 130 may edit the plurality of displayed car images 10 to 50 (for example, may delete a car image selected from among the plurality of car images 10 to 50) according to a user command which is input through the input unit 110.

As described above, the controller 130 controls the photographing unit 110 to be booted if the photographing apparatus is in the auto continuous shooting mode when being turned on. However, this should not be considered as limiting. If the photographing apparatus is in the auto continuous shooting mode when being turned on, the controller 130 may control the photographing unit 110 to be booted and simultaneously may control at least one of the other elements, that is, at least one of the display unit 150 and the audio output unit 160 to be booted. According to such a control command, the display unit 150 performs booting such as LCD on performing a live view and display of OSD on an LCD. The audio output unit 160 may perform audio setting relevant booting to output a sound.

Hereinafter, a condition for booting at least one of the aforementioned elements when the lens unit 111 of the photographing unit 110 is booted will be explained.

Figure 5:
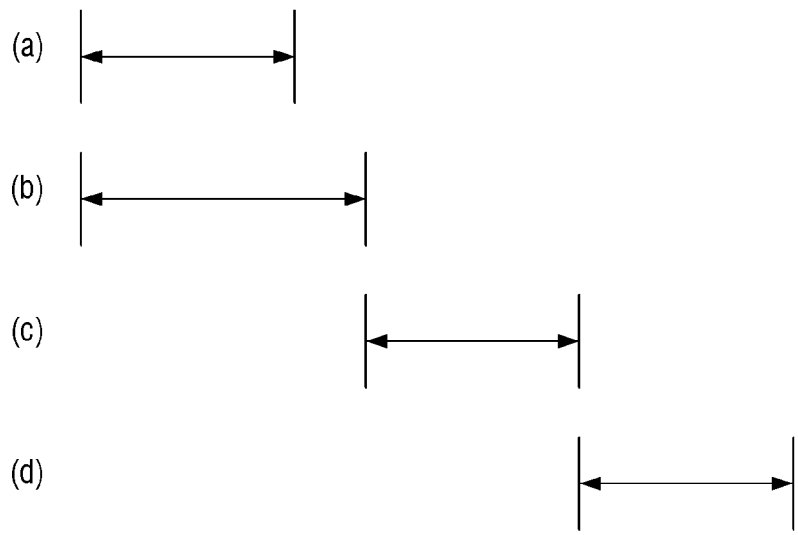
FIG. 5 is a view to explain a condition for booting a lens unit of the photographing unit according to an exemplary embodiment.
Figure 6:
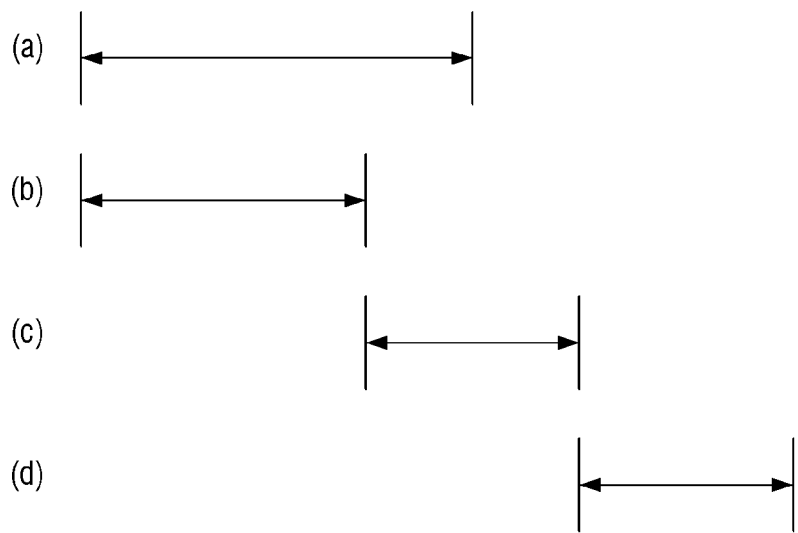
FIG. 6 is a view to explain a condition for booting the lens unit of the photographing unit and one of the other elements, simultaneously, according to an exemplary embodiment.
Figure 7:
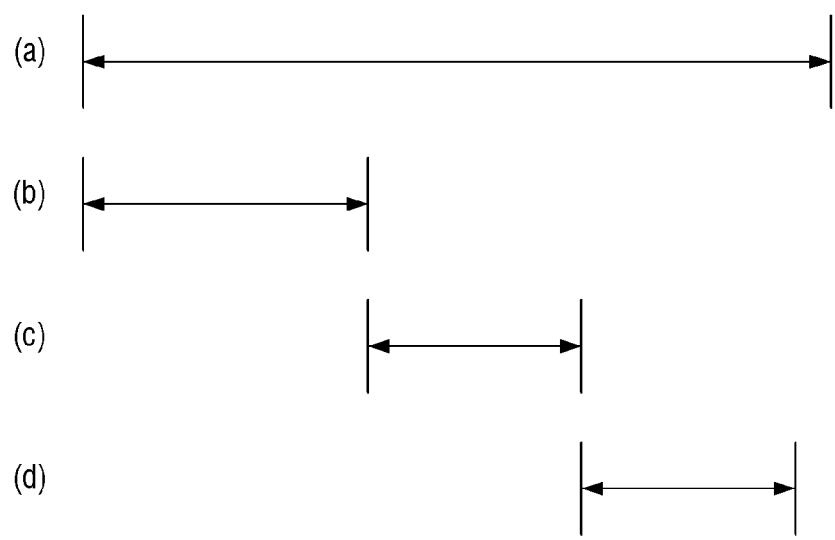
FIG. 7 is a view to explain a condition for booting all elements including the lens unit of the photographing unit according to an exemplary embodiment.

FIG. 5 is a view to explain a condition for booting the lens unit of the photographing unit according to an exemplary embodiment, FIG. 6 is a view to explain a condition for booting the lens unit of the photographing unit and one of the other elements simultaneously according to an exemplary embodiment, and FIG. 7 is a view to explain a condition for booting all elements including the lens unit of the photographing unit according to an exemplary embodiment.

In FIGS. 5 to 7, graph (a) illustrates a time which is required to complete booting of the lens unit 111 of the photographing unit 110, which performs lens field emission. However, this should not be considered as limiting, and graph (a) may illustrate a time which is required to complete booting of each element of the aforementioned photographing unit 110. In the specification, graph (a) illustrates a time which is required to complete booting of the lens unit 111 of the photographing unit 110. Graphs (b) and (c) relate to booting of the display unit 150, and more particularly, and graph (b) illustrates a time which is required to complete LCD on booting performing a live view, and graph (c) illustrates a time which is required to complete booting of display of OSD on the LCD. Finally, graph (d) illustrates a time which is required to complete booting of the audio output unit 160, which performs audio output.

Referring to FIG. 5, it can be seen that booting of the lens unit 111 of the photographing unit 110 is completed earlier than the display unit 150 and the audio output unit 160. The lens unit 111 of the photographing unit 110 is booted to perform lens field emission. That is, the LCD on booting of the display unit 150 continues even after the lens field emission is completed by booting the lens unit 111, and OSD booting is performed at a time when the LCD on booting of the display unit 150 is completed. Also, the audio output unit 160 starts to be booted at a time when the OSD booting is completed.

In other words, the display unit 150 and the audio output unit 160 may be booted or may not be booted at the time when the booting of the lens unit 111 of the photographing unit 110 is completed. In this case, the controller 130 may control the photographing unit 110 to be booted, and, if the booting of the lens unit 111 of the photographing unit 110 is completed, the controller 130 may control the photographing unit 110 to perform auto continuous shooting.

Referring to FIG. 6, it can be seen that the LCD on booting of the display unit 150 is completed before the booting of the lens unit 111 of the photographing unit 110 is completed. The OSD booting starts at a time when the LCD on booting of the display unit 150 is completed, and is completed after the booting of the lens unit 111 is completed. The booting of the audio output unit 160 starts at a time when the OSD booting is completed.

In other words, it can be seen that the LCD on booting of the display unit 150 is completed before the booting of the lens unit 111 of the photographing unit 110 is completed. In this case, the controller 130 may control to perform the booting of the photographing unit 110 and the LCD on booting of the display unit 150, and, if the booting of the lens unit 111 of the photographing unit 110 is completed, may control the photographing unit 110 to perform auto continuous shooting.

Referring to FIG. 7, it can be seen that the booting of the display unit 150 and the audio output unit 160 is completed before the booting of the lens unit 111 of the photographing unit 110 is completed. In this case, the controller 130 may control to perform booting of the photographing unit 110, the display unit 150, and the audio output unit 160, and, if the booting of the lens unit 111 of the photographing unit 110 is completed, the controller 130 may control the photographing unit 110 to perform auto continuous shooting.

As described above, the controller 130 controls the photographing unit 110 to perform the auto continuous shooting at the time when the booting of the photographing unit 110 is completed, and, if the auto continuous shooting is completed, the controller 130 may control the element that does not perform booting from among the display unit 150 and the audio output unit 160 to be booted. Also, if the auto continuous shooting is completed, the controller 130 may change the mode to the photographing mode that has been finally set before the photographing apparatus is turned on.

According to an exemplary embodiment, the photographing mode that has been finally set before the command to turn on the photographing apparatus is input through the input unit 120 may be a general photographing mode. In this case, if the auto continuous shooting is completed by the photographing unit 110, the controller 130 finishes the auto continuous shooting and stands by in the general photographing mode, which has been finally set before the command to turn on the photographing apparatus is input. After that, if a photographing command is input through the input unit 120, the controller 130 may control the photographing unit 110 to photograph in the general photographing mode.

Up to now, the elements of the photographing apparatus according to the exemplary embodiments have been described. Hereinafter, a method of performing auto continuous shooting of a photographing apparatus according to an exemplary embodiment will be explained in detail.

FIG. 8 is a flowchart illustrating a method of performing auto continuous shooting of a photographing apparatus according to an exemplary embodiment.

As shown in FIG. 8, the photographing apparatus periodically checks whether a user command to turn on the photographing apparatus is input through a power button (operation S810). As a result of the checking, if the user command to turn on the photographing apparatus is input, the photographing apparatus recognizes a currently set photographing mode and checks whether the photographing mode is set to an auto continuous shooting mode (operation S830). According to an exemplary embodiment, the photographing apparatus may include a mode dial to set the photographing mode such as a general photographing mode, a moving picture photographing mode, and an auto continuous shooting mode. Accordingly, the photographing apparatus may determine whether the photographing mode set by the mode dial is the general photographing mode, the moving picture photographing mode or the auto continuous shooting mode.

According to another exemplary embodiment, the photographing apparatus may store the photographing mode which is pre-set according to a user command. That is, the user may set the auto continuous shooting mode so that auto continuous shooting is performed every time that the power button to turn on the photographing apparatus is pressed.

If power is supplied according to the user command to turn on the photographing apparatus, the photographing apparatus checks whether the photographing mode set by the mode dial or user manipulation is the auto continuous shooting mode. As a result of the checking, if it is determined that the auto continuous shooting mode is not set, the photographing apparatus boots all of the elements including the photographing unit to photograph an image (operation S840). Specifically, if it is determined that the photographing apparatus is not set to the auto continuous shooting mode, the photographing apparatus boots the photographing unit to photograph an image, the display unit to display the photographed image, and the audio output unit to output a sound in sequence or simultaneously. Accordingly, the photographing unit is booted to perform lens field emission, the display unit performs booting such as the LCD on performing a live view and display of OSD on an LCD, and the audio output unit performs audio setting relevant booting to output a sound. After that, the photographing apparatus changes the mode to a mode that has been set before the photographing apparatus is turned on and enters a standby state for the corresponding photographing mode.

On the other hand, as a result of the checking, if it is determined that the auto continuous shooting mode is set, the photographing apparatus boots the photographing unit to photograph an image from among the aforementioned elements (operation S850). According to an exemplary embodiment, the photographing mode pre-set by the mode dial or user manipulation may set to a plurality of photographing modes including the auto continuous shooting mode. In this case, the photographing apparatus may select an operation corresponding to the auto continuous shooting mode first.

If it is determined that the photographing mode is set to the auto continuous shooting mode in operation S830, the photographing apparatus supplies power to the photographing unit and boots the photographing unit (operation S850). After this, if the booting of the photographing unit is completed, the photographing apparatus performs auto continuous shooting as much as a predetermined number of copies, and directly stores an image which is photographed by the auto continuous shooting (operation S860).

According to an exemplary embodiment, the photographing apparatus may perform the auto continuous shooting as much as the predetermined number of copies at a time when booting of the lens unit from among the elements included in the photographing unit, that is, the lens unit, the image sensor, and the image processor, is completed, and may store the image. However, this should not be considered as limiting, and the photographing apparatus may perform the auto continuous shooting at a time when booting of all of the elements included in the photographing unit is completed or when booting of the element that requires the longest time to boot from among the elements included in the photographing unit is completed. The present disclosure puts a limit to the auto continuous shooting that is performed at the time when the booting of the lens unit is completed. The booting of the lens unit refers to a process during which lens field emission is performed. Accordingly, if the lens field emission is performed as the lens unit is booted, the photographing apparatus may perform the auto continuous shooting as much as the predetermined number of copies through the photographing unit, and may store the image which is photographed by the auto continuous shooting.

As described above, in the auto continuous shooting mode, the photographing apparatus boots the photographing unit from among the photographing unit, the display unit, and the audio output unit. However, this should not be considered as limiting, and, in the auto continuous shooting mode, the photographing apparatus may boot the photographing unit and simultaneously may boot at least one of the other elements, that is, the display unit and the audio output unit.

According to an exemplary embodiment, the booting of the lens unit may be completed earlier than the display unit and the audio output unit as shown in FIG. 5. That is, if the booting of the display unit and the audio output unit continues or is not performed at the time when the booting of the lens unit is completed, the photographing apparatus boots only the lens unit.

According to another exemplary embodiment, LCD on booting of the display unit may be completed before the booting of the lens unit is completed as shown in FIG. 6. In this case, the photographing apparatus may perform booting of the lens unit and LCD on booting of the display unit.

According to still another exemplary embodiment, the booting of the display unit and the audio output unit may be completed at the time when the booting of the lens unit is completed as show in FIG. 7. In this case, the photographing apparatus may boot the lens unit and simultaneously boot the display unit and the audio output unit.

According to at least one of the above-described exemplary embodiments, if the booting of the lens unit of the photographing unit is completed, the photographing apparatus performs the auto continuous shooting as much as the predetermined number of copies through the photographing unit, and stores a plurality of images which are generated by the auto continuous shooting. After that, the photographing apparatus finishes the auto continuous shooting, changes the mode to the photographing mode that has been finally set before the command to turn on the photographing apparatus is input, and enters a standby state to photograph in the corresponding photographing mode (operation S870).

According to an exemplary embodiment, the photographing mode that has been finally set before the user command to turn on the photographing apparatus is input may be a general photographing mode. In this case, if the auto continuous shooting is completed by the photographing unit, the photographing apparatus finishes the auto continuous shooting, and changes the mode to the general photographing mode which has been finally set before the command to turn on the photographing apparatus is input, and enters a standby state to perform general photographing. Accordingly, if a photographing command is input by the user, the photographing apparatus may photograph an image through the photographing unit in the general photographing mode.

A program code to perform the method of photographing according to the above-described various exemplary embodiments may be stored in a non-transitory computer readable medium. The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a CD, a DVD, a hard disk, a Blueray disk, a USB, a memory card, and a ROM, and may be provided.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A photographing apparatus comprising:
a photographing unit which photographs an image;
an input unit which receives a user command; and
a controller which, if a user command to turn on the photographing apparatus is input through the input unit, determines whether the photographing apparatus is set to an auto continuous shooting mode, and, if it is determined that the photographing apparatus is set to the auto continuous shooting mode, controls the photographing unit to perform auto continuous shooting after power is supplied to the photographing unit,
wherein, if the auto continuous shooting is completed, the controller automatically changes the auto continuous shooting mode to a photographing mode that has been finally set before the photographing apparatus is turned on.

2. The photographing apparatus as claimed in claim 1, further comprising a storage unit,
wherein the controller directly stores an image which is photographed by the auto continuous shooting in the storage unit.

3. The photographing apparatus as claimed in claim 1, wherein the photographing unit comprises a lens unit,
wherein, if the user command to turn on the photographing apparatus is input through the input unit, the controller controls the photographing unit to be booted and controls the photographing unit to perform the auto continuous shooting at a time when booting of the lens unit of the photographing unit is completed.

4. The photographing apparatus as claimed in claim 3, further comprising:
a display unit which displays a photographed image; and
an audio output unit which outputs a sound,
wherein the controller boots at least one of the display unit and the audio output unit, while booting the lens unit.

5. The photographing apparatus as claimed in claim 1, wherein, if a plurality of photographing modes including the auto continuous shooting mode are set as a mode executed after the photographing apparatus is turned on, the controller controls an operation corresponding to the auto continuous shooting mode to be performed first.

6. The photographing apparatus as claimed in claim 4, wherein, if it is determined that the photographing apparatus is not set to the auto continuous shooting mode, the controller boots the photographing unit, the display unit, and the audio output unit.

7. A method of performing auto continuous shooting in a photographing apparatus, the method comprising:
receiving a user command to turn on the photographing apparatus;
determining whether the photographing apparatus is set to an auto continuous shooting mode; and
if the photographing apparatus is set to the auto continuous shooting mode, performing auto continuous shooting after power is applied to a photographing unit which photographs an image; and
if the auto continuous shooting is completed or an image which is photographed by the auto continuous shooting is stored, automatically changing the auto continuous shooting mode to a photographing mode that has been finally set before the photographing apparatus is turned on.

8. The method as claimed in claim 7, further comprising:
directly storing an image which is photographed by the auto continuous shooting.

9. The method as claimed in claim 7, wherein the performing the auto continuous shooting comprises performing the auto continuous shooting at a time when booting of a lens unit of the photographing unit is completed.

10. The method as claimed in claim 9, wherein the performing the auto continuous shooting comprises booting at least one of a display unit which displays a photographed image and an audio output unit which outputs a sound, while the lens unit is being booted.

11. The method as claimed in claim 7, wherein the determining comprises, if a plurality of photographing modes including the auto continuous shooting mode are set as a mode executed after the photographing apparatus is turned on, determining that the photographing apparatus is set to the auto continuous shooting mode.

12. The method as claimed in claim 9, further comprising:
if it is determined that the photographing apparatus is not set to the auto continuous shooting mode, booting the photographing unit, the display unit, and the audio output unit.

13. A photographing apparatus, comprising:
a photographing unit including at least one element required to take a photograph of an image; and
a controller to determine whether the photographing apparatus is set to an auto continuous shooting mode, and to control the photographing unit to perform auto continuous shooting of an image after booting of each of the at least one element required to take a photograph and before completion of booting of remaining elements not required to take a photograph, after power is supplied to the photographing unit and it is determined that the auto continuous shooting mode is set,
wherein, if the auto continuous shooting is completed, the controller automatically changes the auto continuous shooting mode to a photographing mode that has been finally set before the photographing apparatus is turned on.

14. The photographing apparatus of claim 13, further comprising:
an input unit to receive a command to turn the photographing apparatus on and begin booting of the photographing unit elements.

15. The photographing apparatus of claim 13, further comprising:
a display unit; and
an audio output unit,
wherein the controller controls the photographing unit to perform the auto continuous shooting at a time when booting of the at least one required element is completed and while the display unit and the audio unit are being booted, when it is determined that the photographing apparatus is set to an auto continuous shooting mode.

16. The photographing apparatus of claim 15, wherein if it is determined that the photographing apparatus is not set to the auto continuous shooting mode, booting the photographing unit, the display unit, and the audio output unit.

17. The photographing apparatus of claim 13, wherein the elements of the photographing unit comprise:
a lens unit;
an image sensor; and
an image processor,
wherein the controller controls the photographing unit to perform the auto continuous shooting at a time when booting of the element that requires the longest booting time is completed.

18. The photographing apparatus of claim 13, wherein the elements of the photographing unit comprise:
a lens unit;
an image sensor; and
an image processor,
wherein the controller controls the photographing unit to perform the auto continuous shooting at a time when booting of the lens unit is completed.

\* \* \* \* \*

UNITED STATES PATENT AND TRADEMARK OFFICE
CERTIFICATE OF CORRECTION

| | | |
|---|---|---|
| PATENT NO. | : 9,100,571 B2 | Page 1 of 1 |
| APPLICATION NO. | : 13/927293 | |
| DATED | : August 4, 2015 | |
| INVENTOR(S) | : Seon-jeong Lee | |

It is certified that error appears in the above-identified patent and that said Letters Patent is hereby corrected as shown below:

In the claims

Claim 7, Column 12, Line 39

After "mode;" delete "and".

Signed and Sealed this
Twenty-fourth Day of November, 2015

Michelle K. Lee
*Director of the United States Patent and Trademark Office*